May 29, 1956
R. LUCIEN
2,747,699
AUTOMATIC BRAKE REGULATOR FOR
AIRCRAFT WHEELS AND THE LIKE
Filed Nov. 7, 1951
2 Sheets-Sheet 1
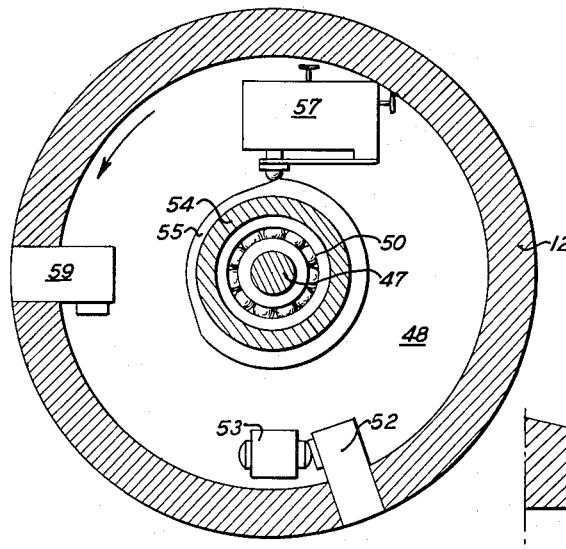
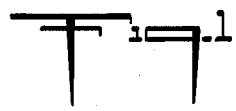
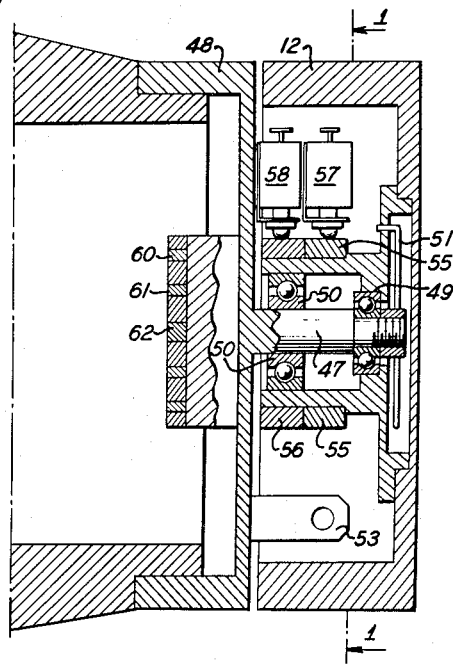
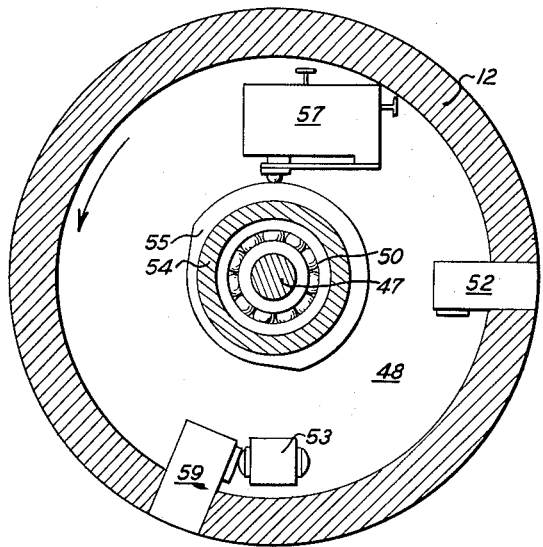
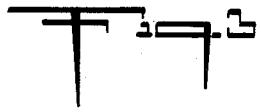

United States Patent Office 2,747,699
Patented May 29, 1956

2,747,699

AUTOMATIC BRAKE REGULATOR FOR AIRCRAFT WHEELS AND THE LIKE

René Lucien, Paris, France, assignor to Société d'Inventions Aéronautiques et Mécaniques S. I. A. M., Fribourg, Switzerland, a corporation of Switzerland Application November 7, 1951, Serial No. 255,268

Claims priority, application France November 7, 1950

3 Claims. (Cl. 188—181)

The present invention relates to an automatic brake regulator for preventing the skidding of aircraft wheels when they are braked or for reducing to a minimum the duration and the effects of such skidding. The regulator therefore performs on the one hand the function of a safety arrangement since it renders possible the full use of the brakes by the pilot and thus enables the stopping distance of the aircraft to be reduced by a proportion of the order of 30% to 50%, while on the other hand it represents a considerable economy factor in that it prevents wear on tires under the effect of skidding. It is particularly advantageous in its application to tandem wheels, since in this case the braking couple loads the front wheel of the tandem and reduces the load on the rear wheel, skidding of which is almost unavoidable in the absence of a braking controller.

The regulator according to the invention is characterised in that it comprises in combination:

1. An acceleration responsive device mounted on the wheel and consisting of a mass, such as a fly-wheel, which is freely rotatable with respect to the wheel and co-operates with two microswitches secured to rotate with the wheel.

2. A control box including an electric relay, to which there are connected two circuits, the opening and closing of which are controlled by the movement of the said microswitches.

3. An electrically operated valve which is controlled by the control box and which is connected in the normal braking circuit, for example a hydraulic circuit, and connects the said circuit either to the tank or to the pressure according to its energization by the control box.

The system is such that when the wheel commences to skid the braking circuit is connected to the tank and remains connected thereto regardless of the action exerted by the operator on the said circuit, as long as the wheel continues to slip on the ground.

The microswitches of the system for the automatic regulation of the braking are so calibrated that the said system becomes operative as soon as the deceleration of the wheel exceeds a selected value corresponding to the maximum normal braking.

A preferred form of the invention is diagrammatically illustrated in the accompanying drawings, in which:

Figure 1 is a transverse section of an acceleration responsive device on the line I—I of Figure 2, in the position of rest;

Figure 2 is a longitudinal axial section of the construction shown in Figure 1;

Figure 4:
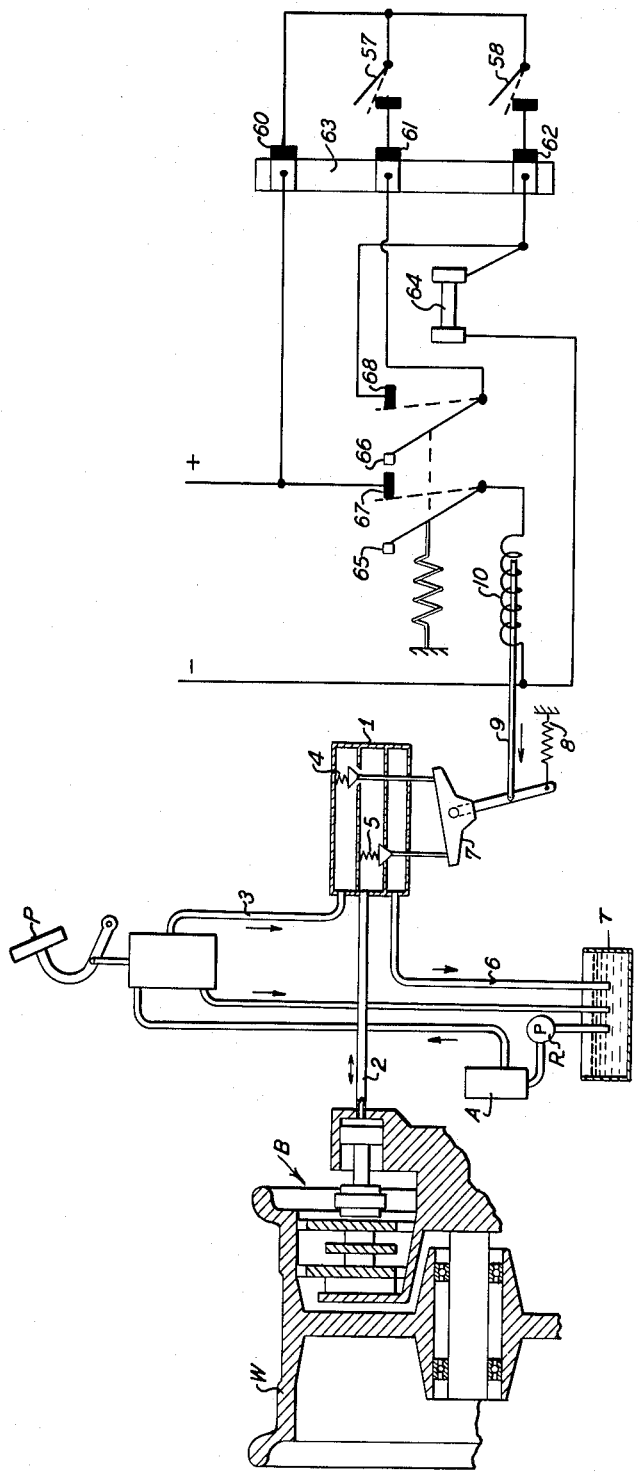

Figure 3 corresponds to Figure 1 for another position of the parts; and,

Figure 4 is a general diagrammatic view with a simplified electrical diagram of a complete brake regulating apparatus.

Referring to Figure 4, the distributor 1 provided in the brake control system places the braking circuit 2, in circuit with a pump R, an accumulator A and a brake pedal P which acts on the wheel brake B of a wheel W, in communication with the pressure-fluid duct 3 when the valve 4 is open and the valve 5 is closed (which is the case shown in the figure), and with the tank T through the duct 6 when the position of the valves is reversed. The said valves are controlled by a rocking member 7 urged constantly by means of a spring 8 in the direction corresponding to the opening of valve 4, i. e. to braking. The rocking member is normally held in this position by a plunger 9 of the electromagnet 10.

The flywheel 12 of Figs. 1 to 3 is mounted on a spindle 47 projecting from a support 48 coaxial with the wheel W and rigidly connected to it. The flywheel 12 is supported on ball bearings 49, 50 and is free to rotate on the said spindle but subject to the action of a spiral return spring 51 which, at rest, brings an abutment 52 fixed to the flywheel 12 against another abutment 53 fixed on the support 48, the return torque exercised by the spring 51 being sufficient for random oscillations of the wheel W not to affect the flywheel 12.

The hub of the flywheel 12 carries two cams 55 and 56 capable of acting on the electric switches 57 and 58 respectively which are carried on the support 48.

Relative angular displacement of the flywheel 12 with respect to the support in the course of successive decelerations and accelerations is limited by the abutment 52 and another abutment 59 also carried by the flywheel 12.

The switches 57 and 58 are connected as shown in Figure 4 to conductor rings 60, 61, 62 turning in contact with brushes carried by a fixed contact member 63 serving a relay 64 which by means of double contacts 65, 66 controls the energisation of the electromagnet 10 which puts the hydraulic braking circuit 2 either in communication with the source of pressure 3 or with the exhaust 6.

This automatic apparatus operates as follows, the arrows indicating on Figures 1 and 3 the direction of rotation of the wheel W:

At rest, the abutment 52 is in contact with abutment 53 under the action of the spring 51 and the position of the cams 55 and 56 is such (Figure 1) that the switches 57 and 58 are open. The relay 64 is not energized and consequently the electromagnet 10 is not excited whereby the actuation of the brake B by the pedal P is permitted.

When the wheel W which is being braked undergoes a skid, that is to say a higher deceleration than a predetermined value, this deceleration produces, by the effect of inertia, rotation of the flywheel 12 with respect to the support 48. Under the action of the cam 55 the switch 57 closes first but this does not yet bring about the excitation of the relay 64; the brake B continues to operate.

When the abutment 59 comes against the abutment 53 (Figure 3) the switch 58 under the action of the cam 56 closes in its turn, while 57 remains closed. The relay 64 is then energized so that by the closing of the contact 65 on the contact 67 the energization of the electromagnet 10 is brought about and thus the brake B is released.

If now the wheel W is subjected to an acceleration, the abutment 53 moves away from the abutment 59 and again toward the abutment 52 as the flywheel 12 returns towards the position of static equilibrium. The switch 58 thus opens but the switch 57 remains closed and the relay 64 holds on by reason of the contact 66 which is already closed on the contact 68, so that the electromagnet 10 is still energized and the release of the brake is maintained. It ceases at the opening of the switch 57 when the abutment 53 is brought back into contact with the abutment 52, the acceleration responsive device thus taking its position of rest which permits braking.

The system which has been described presents two important characteristics which it is desired to emphasize:

1. A skid-detector of the kind represented by the inertia flywheel functions without necessitating a loss of energy. In fact, the function of this flywheel is limited to establishing electrical contacts. No energy is dissipated or consumed, as for example would occur by the use of a device dependent upon friction or of a torque limiter or other apparatus which in the ultimate analysis wastes energy. This characteristic of the invention is important, for owing to it the inertia flywheel is not called upon to store much energy. Therefore, it can be of very small dimensions, which is naturally advantageous, above all in the domain of aviation.

2. If one regulates the electrical contacts controlled by the rotation of the inertia flywheel in such manner that the angle of rotation which corresponds to the deceleration signal is appreciably greater than that which corresponds to the acceleration signal, it results that, due to the damping of the flywheel (a damping which can be regulated by any appropriate means such as a film of air or of oil or by magnetic damping) there is no risk of the brake remaining inoperative.

Thus if, in the course of the oscillations of the flywheel, the movement ceases to be maintained by decelerations and accelerations of the wheel, the displacements of the flywheel around its position of rest will go on decreasing. This amplitude will pass through a value for which on one side of the contact "deceleration" will not be established while on the other side the contact "acceleration" will be established. Consequently in every state of the case the brake will necessarily be reapplied. This satisfactory characteristic plays a useful role when the vehicle is stopped for a period where the brake is put out of action.

I claim:

1. An automatic anti-skid brake regulating device for the wheels of aircraft and the like comprising a brake cylinder for applying the brakes to the wheel, pressure fluid control means for actuating the brake including a valve having an inlet connected to a source of pressure fluid and two chambers connected respectively to the brake and to a sump, an electromagnet for actuating the valve, an electrical circuit controlling the electromagnet to shift the valve and establish a communication between the source and the cylinder when no current flows through the circuit and between the cylinder and the sump when current flows, a circular plate coaxial with the wheel and rotatable therewith, a flywheel freely rotatable about the axis of the circular plate, a spiral spring connected at one end to the plate and at the other end to the flywheel, abutments mounted respectively on the plate and on the flywheel and mutually engageable to limit the relative angular movement thereof, the initial tension of the spring being such as to cause an abutment of the flywheel to engage an abutment of the plate, cams coaxial with the flywheel and rotatable therewith, and switches on the plate included in the circuit and actuatable by the cams for closing and opening the circuit in accordance with the relative angular positions of the plate and flywheel.

2. A device as in claim 1 comprising two said cams and two said switches each actuatable by one cam, said switches and cams being so positioned that the switches are closed at different relative positions of the plate and flywheel, said device further comprising electrical connecting means to close the circuit, upon relative rotation of the plate and flywheel in a direction to tension the spring, after both switches are closed and to open the circuit, upon relative rotation in the opposite direction, after both switches are opened.

3. A device as in claim 2 wherein the electrical connecting means comprise three mutually insulated collecting rings mounted coaxially on the plate, a fixed brush cooperating with each ring, a connection from each of two brushes to one of the switches, a relay energizing the electromagnet and connected to said two brushes, and electrical connections between the relay and the collecting rings to cause the relay to be energized only after both switches are closed and to be de-energized only after both switches are opened.

References Cited in the file of this patent
UNITED STATES PATENTS

| | | |
|---|---|---|
| 2,115,534 | Nash | Apr. 26, 1938 |
| 2,363,611 | Newell | Nov. 28, 1944 |
| 2,393,031 | Eksergian | Jan. 15, 1946 |
| 2,491,666 | Keller | Dec. 20, 1949 |
| 2,631,696 | Yarber | Mar. 17, 1953 |